United States Patent [19]
Luo et al.

[11] Patent Number: 5,990,584
[45] Date of Patent: Nov. 23, 1999

[54] DIRECT CURRENT TORQUE MOTOR WITH EXTENDED STATOR POLES

[75] Inventors: Jian Luo, Southfield; David Turner, Bloomfield Hills; Charles A. Detweiler, Durand, all of Mich.

[73] Assignee: Eaton Corporation, Cleveland, Ohio

[21] Appl. No.: 09/139,889

[22] Filed: Aug. 25, 1998

[51] Int. Cl.$^6$ .......................... H02K 33/16; H02K 33/00
[52] U.S. Cl. ..................... 310/36; 310/216; 310/254; 310/258; 310/156; 335/229; 335/281
[58] Field of Search ................. 310/36, 38, 39, 310/177, 156, 216, 254, 258, 259; 417/410.1; 335/229, 281

[56] References Cited

U.S. PATENT DOCUMENTS

| | | | |
|---|---|---|---|
| 3,644,763 | 2/1972 | Skrobisch | 310/36 |
| 4,345,228 | 8/1982 | Idogaki et al. | 310/36 |
| 4,500,861 | 2/1985 | Nelson | 335/253 |
| 4,575,652 | 3/1986 | Gogue | 310/49 R |
| 4,731,778 | 3/1988 | Van Hout et al. | 369/266 |
| 5,355,373 | 10/1994 | Salmon et al. | 310/71 |

*Primary Examiner*—Nestor Ramirez
*Assistant Examiner*—B Mullins
*Attorney, Agent, or Firm*—Roger A. Johnston

[57] ABSTRACT

A permanent magnet D.C. torque motor has the stator mounted in cantilever from a base and nested in a cup-shaped rotor journalled for rotation on the base. The permanent magnets are disposed about the inner periphery of the rotor. The stator core has a plurality of radially outwardly directed webs with coils therearound and may be formed integrally as one-piece or laminated. The pole segments may be integrally formed with the web or attached as separate members. The pole segments have truncated cylindrical pole shoe surfaces forming radial air gaps with the rotor magnets. The pole segments extend axially and transversely beyond the webs. The axial pole segment extensions provide increased total flux for a given motor volume without an increase in ampere turns of electrical energization. The motor of the present invention is particularly suitable as an engine air throttle actuator.

8 Claims, 5 Drawing Sheets

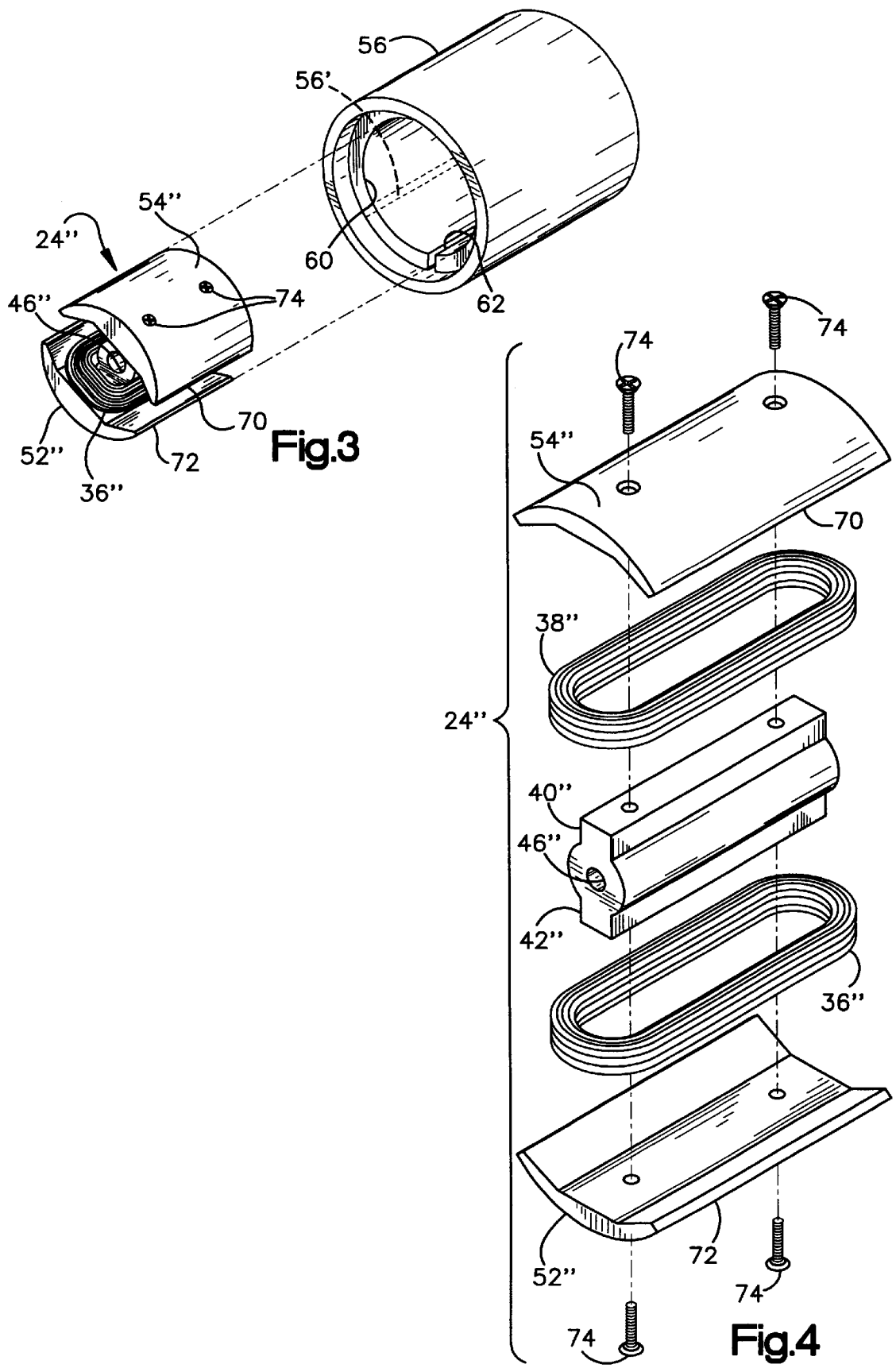

DIRECT CURRENT TORQUE MOTOR WITH EXTENDED STATOR POLES

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to direct current torque motors of the type intended for forward or reverse rotation by an amount less than one complete revolution of the motor rotor. Torque motors of this type typically are employed for servo actuator devices where fractional revolution rotation of a shaft is required for performing a work function. In particular, it has been desired to utilize torque motors for actuating the air intake throttle valve of an internal combustion engine in response to a control signal provided by an electronic controller. This is due in part to the recently imposed strict engine exhaust emission requirements for motor vehicles which have necessitated electronic control of vehicle engine operating parameters.

In such internal combustion engine throttle applications and particularly engine throttle applications for motor vehicles, it is desired to minimize the size and weight of the torque motor in as much as it must be attached to the engine throttle body structure and is therefore subjected to the elevated temperature and vibration encountered by the engine structure. Furthermore, the torque motor must provide a substantial torque output with minimum motor coil excitation current in as much as the motor is operating, in a typical automotive application at relatively low voltages on the order 12–24 volts DC. Therefore, it has been desired for an electrically operated motor vehicle engine throttle actuator to provide a torque motor which has a maximum torque with a minimum of magnetic pole structure mass in the rotor and stator and which is robust and accurate in rotor positioning for a given coil excitation current in order to provide accurate positioning of the vehicle throttle in response to an electrical throttle control signal from an onboard electrical controller. Furthermore, it has been desired to provide a low voltage direct current torque motor of minimum mass and size for a vehicle throttle application which does not require pole structure fabrication of relatively exotic or expensive materials of high magnetic permeability but is capable of being fabricated from relatively low cost iron based material.

Heretofore, it has been found possible to provide a direct current torque motor for vehicle engine throttle operation which provides the requisite torque for insuring proper throttle positioning for a given control signal, however, the known torque motor designs have proven either prohibitive in production costs for high volume applications, or have been prohibitively bulky and heavy.

Therefore, it has long been desired to provide a direct current torque motor for servo actuator operation at relatively low voltages, particularly for vehicle engine throttle positioning which has a minimum mass, volume and maximizes the torque output therefrom for a given motor coil excitation current and which does not require relatively high cost materials.

BRIEF SUMMARY OF THE INVENTION

It is an object of the present invention to provide a relatively low cost compact torque motor capable of operation at relatively low voltages and which provides maximum torque output for a fraction of a revolution of rotation of the motor shaft in forward or reverse direction and has a maximum power density with respect to the mass and volume of the motor for a given level of electrical energization.

The present invention provides a torque motor having the magnetic flux loop components thereof, particularly the stator and rotor, formed of low cost ferrous material such as low carbon steel with the stator nested within a cup-shaped cylindrical rotor having permanent magnets disposed about the inner periphery. The motor is constructed to be mounted in cantilever arrangement from a base mounting wall and is particularly adaptable for mounting to the throttle body of an internal combustion engine air inlet for operating the engine throttle valve. The stator of the motor has a plurality of radially extending webs with stator coils wound thereon with each of the webs having a cylindrical pole segment formed thereon which extends transversely beyond the web. Each of the pole segments also extends axially beyond the web for maximizing the amount of flux collecting by magnetically permeable material. Each pole segment has a truncated cylindrical surface or pole face disposed for conducting flux across a radial air gap to the rotating permanent magnets on the rotor. The stator webs and pole faces may be formed integrally either as one piece or by lamination. Alternatively the pole face portions of the stator may be separate pieces attached to the stator webs on an integrally formed stator core after the coils have been positioned thereon.

BRIEF DESCRIPTION OF THE DRAWINGS

FIG. 3 is an exploded view of the stator with coil and rotor of the motor of FIG. 1 employing an alternative embodiment of the stator;

FIG. 4 is an exploded view of the stator subassembly of the motor of FIG. 3;

DETAILED DESCRIPTION OF THE INVENTION

Figure 1:
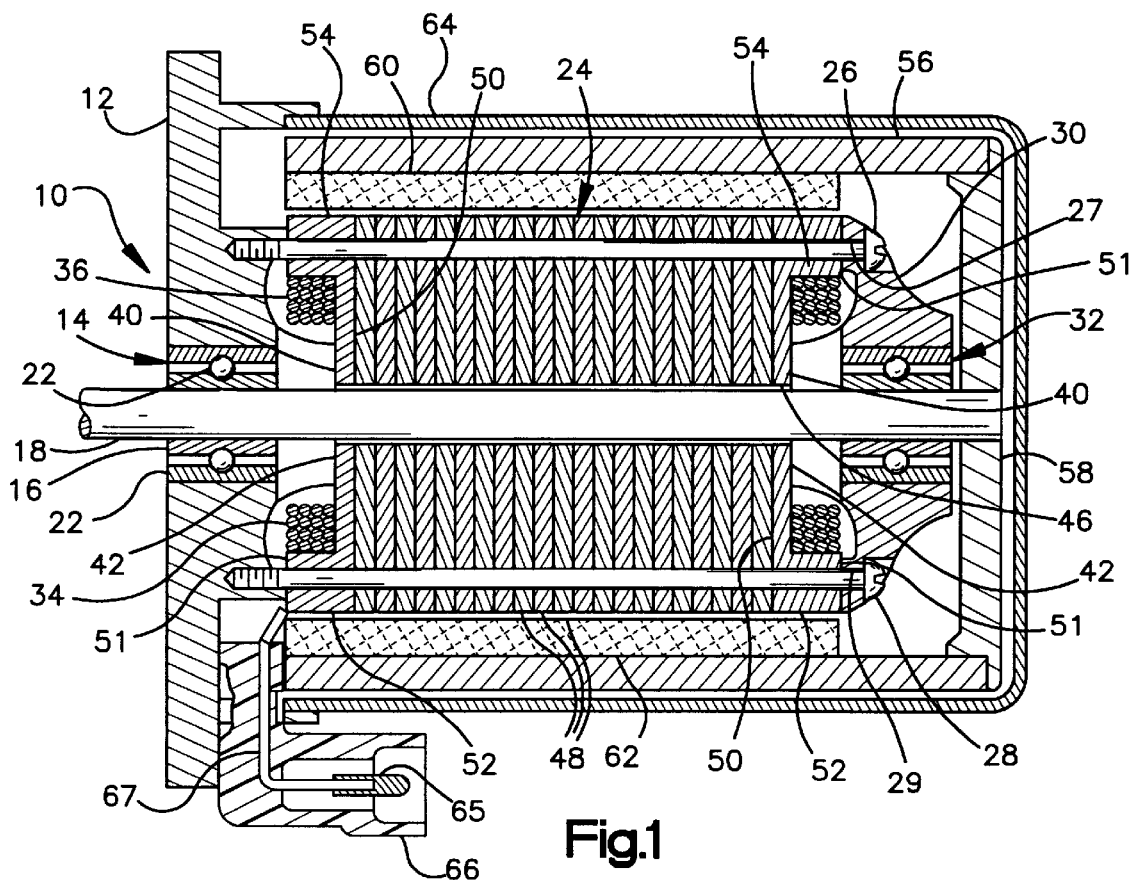
FIG. 1 is a cross-section of a laminated stator embodiment of the torque motor of the present invention.
Figures 2A, 2B:
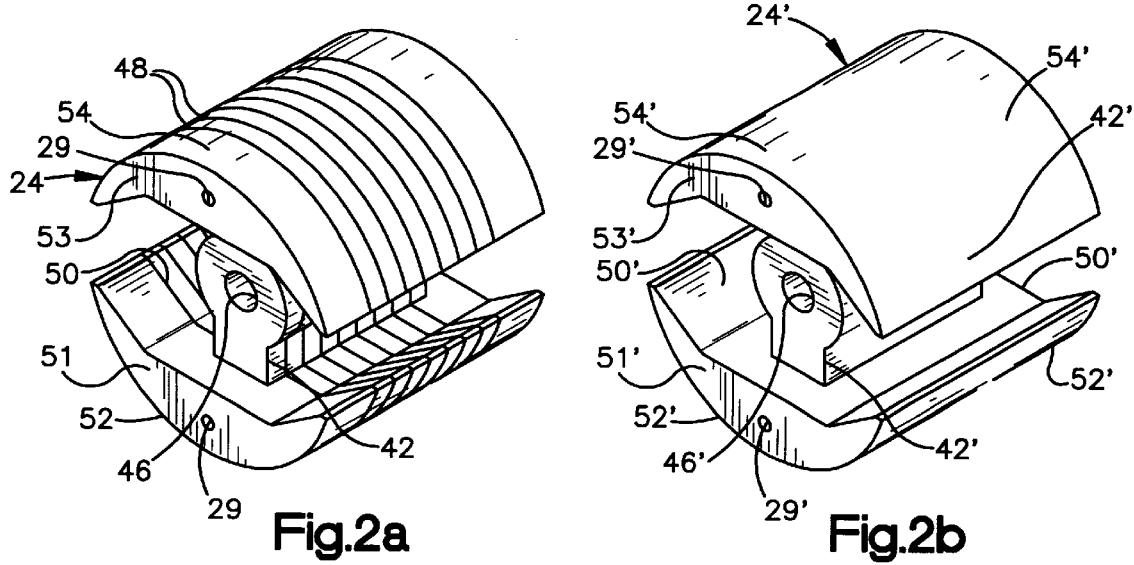
FIG. 2a is a perspective view of a laminated one-piece stator for the embodiment of FIG. 1.
FIG. 2b is an alternative one-piece embodiment of the stator for the motor of FIG. 1.

Referring to FIG. 1 and 2a, the invention is embodied in a motor assembly indicated generally at 10 an includes a base or mounting structure 12 having a bearing indicated generally at 14 which has an inner race 16 fitted on to a shaft 18 and an outer race 20 which may have the inner race 16 journalled directly therein but preferably has a plurality of ball races 22 disposed therebetween.

A stator subassembly indicated generally at 24 is retained in cantilever arrangement on the base 12 by any suitable fastening expedient which in the presently preferred practice comprises a plurality of through bolts 26, 28 which also are received through apertures (27) in a bearing cap 30; and, through bolts 26, 28 also extend through apertures 29 in stator subassembly 24. A second bearing indicated generally at 32 is provided in cap 30. Bearing 32 may be constructed in a manner similar to the bearing 14; and, the bearing 30 to thus supports the end of the shaft on the opposite end of the stator 24 from base 12.

The stator subassembly 24 has a plurality of coils 34, 36 wound respectively about web portions 40, 42 which extend in radially opposing directions on opposite sides of the shaft 18 which it will be understood passes through the clearance hole 46 provided in the stator. The stator embodiment of FIG. 1 and FIG. 2a is formed of stacked laminates denoted by reference numerals 48 and has the stack end laminates 50 thereof formed with axially extending portions 51, 53 which extend beyond the webs 40, 42. The outer surface of the stator webs is formed into semi-cylindrical pole shoe surfaces 52, 54; and, on the end laminates 50; the surfaces 52, 54 extending axially beyond the webs 40, 42. The portions 51, 53 of the ends of the stator pole segments serve to provide increased surface area for collection of magnetic flux.

Referring to FIGS. 1 and 3, a generally cupped-shaped rotor 56 is nested over the stator 24 and has the closed end thereof comprising a radially extending web 58 which is attached to the end of shaft 18 which extends through from bearing 32. In the embodiment shown in FIG. 1, the rotor 56 is illustrated as formed of two pieces; however, it will be understood that alternatively the rotor may be formed as a one-piece member, as for example, by deep drawing or impact extrusion.

The rotor 56 has a plurality of elongated permanent magnets 60, 62 disposed about the inner periphery thereof with the number of magnets corresponding to the number of pole shoe surfaces. In the embodiment of FIG. 2a, the rotor will have two permanent magnets as shown in solid outline in FIG. 3.

Referring to FIG. 2b, an alternative embodiment of the stator is illustrated generally at 24' in which the stator webs and pole shoes are formed integrally as a one-piece unit with the pole segments 50', which form the outer pole faces 52', 54', formed integrally with the webs 42'.

It will be readily seen that the outer segments of the stator 50, 50' extend transversely beyond the webs 40, 42; and, this feature is common to the various illustrated embodiments of the invention.

With reference to FIG. 1, the motor 10 has an outer cover 64 disposed over the rotor with an end thereof attached to the base 12 forming a closure for the rotor. The base has an electrical receptacle 66 provided thereon which has at least one electrical connecting terminal 65 connected by lead 67 to the coils 36, 38.

Referring to FIGS. 3 and 4, another embodiment of the stator subassembly for a two-pole motor is indicated generally at 24" and has the web portions 40", 42" formed integrally as a one-piece member having the shaft hole 46" formed centrally thereto. The coils 36", 38" are prewound and positioned over the webs 40", 42". The cylindrical pole faces 52", 54" are formed on separate pole shoe members 70, 72 which are attached respectably to the webs 40", 42" by any suitable expedient such as the fasteners 74 threadedly engaging the stator webs 40", 42" through apertures provided in the member 70, 72, or alternatively by weldment.

Figure 5:
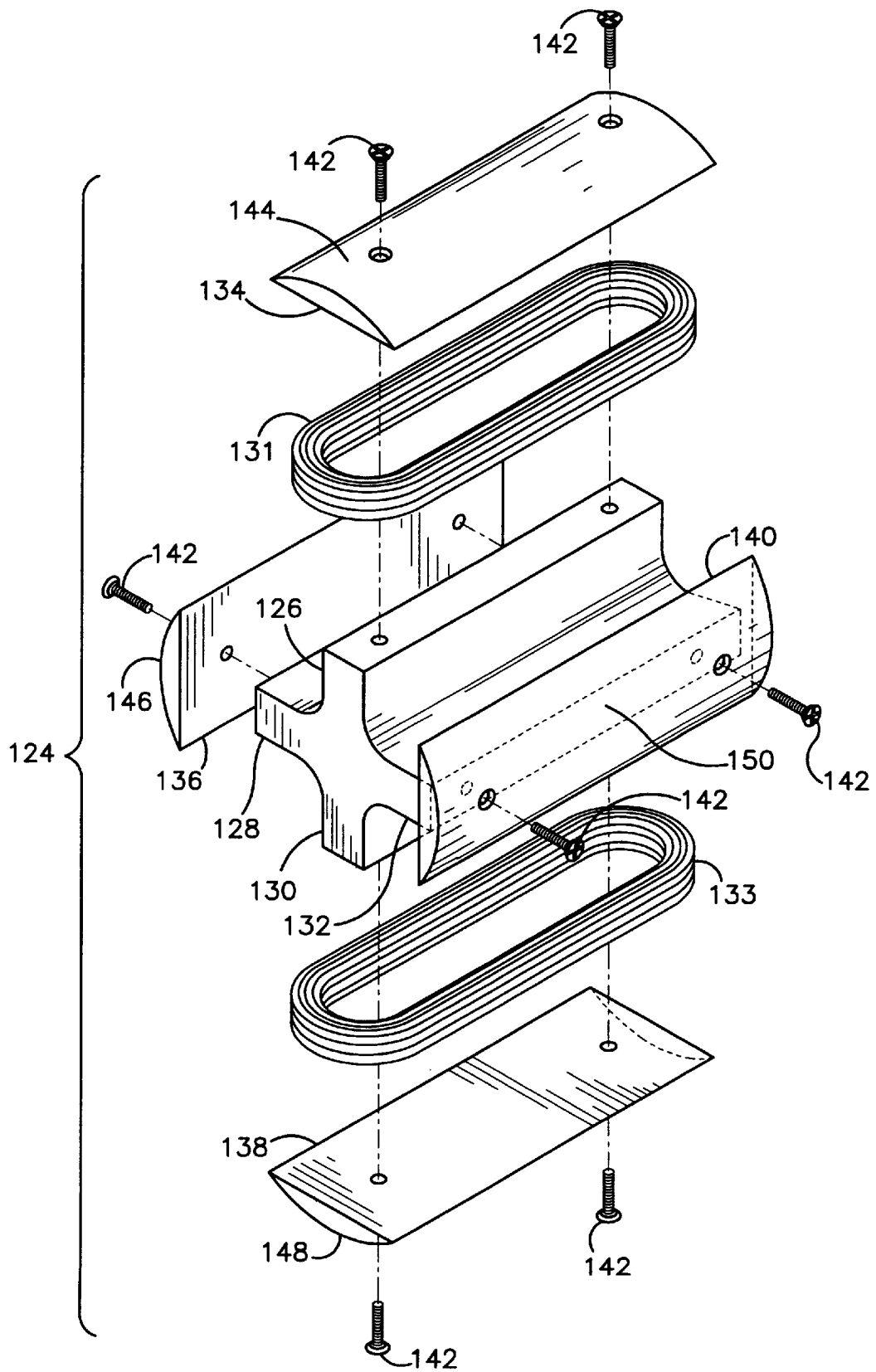
FIG. 5 is an alternative embodiment of the stator subassembly of FIG. 4.

Referring to FIG. 5, another embodiment of the stator subassembly for a four-pole motor is illustrated generally at 124 and has the stator core formed as a one-piece elongated member having in transverse section four radially outwardly directed webs disposed in quadrature or cruciform arrangement and denoted by reference numerals 126, 128, 130 and 132. Separate pole segments or pole shoes of the stator denoted by reference numerals 134, 136, 138, 140 are provided and are attached respectively to each of the webs 126, 128, 130, 132 by any suitable expedient, such as the illustrated fasteners 140, which are received through apertures in the pole segments and which threadedly engage the webs of the stator core. Each of the pole segments 134, 136, 138, 140 has a truncated cylindrical outer pole shoe surface denoted respectively by reference numerals 144, 146, 148, 150 which surfaces each define a radial air gap with the rotor magnets.

A pair of stator coil windings 131, 133 are preferably preformed by winding over a core (not shown) which is removed; and, the coils are then each assembled over one of the oppositely disposed pair of stator core with webs 126, 130. It will be understood that the pole segments or shoes are then attached to the webs retaining the coils thereon. It will also be understood that the pole segments 134, 136, 138, 140 extend axially and transversely beyond the margins of each of the webs 126, 128, 130, 132. The embodiment of FIG. 5 thus provides a four pole stator which is intended for use with a rotor such as rotor 56 but modified with four permanent magnets disposed about the inner periphery thereof which modification is shown in dashed outline in FIG. 3 and denoted by reference numeral 56'. The embodiment of FIG. 5 thus provides a four pole torque motor with only two coils.

Figure 6:
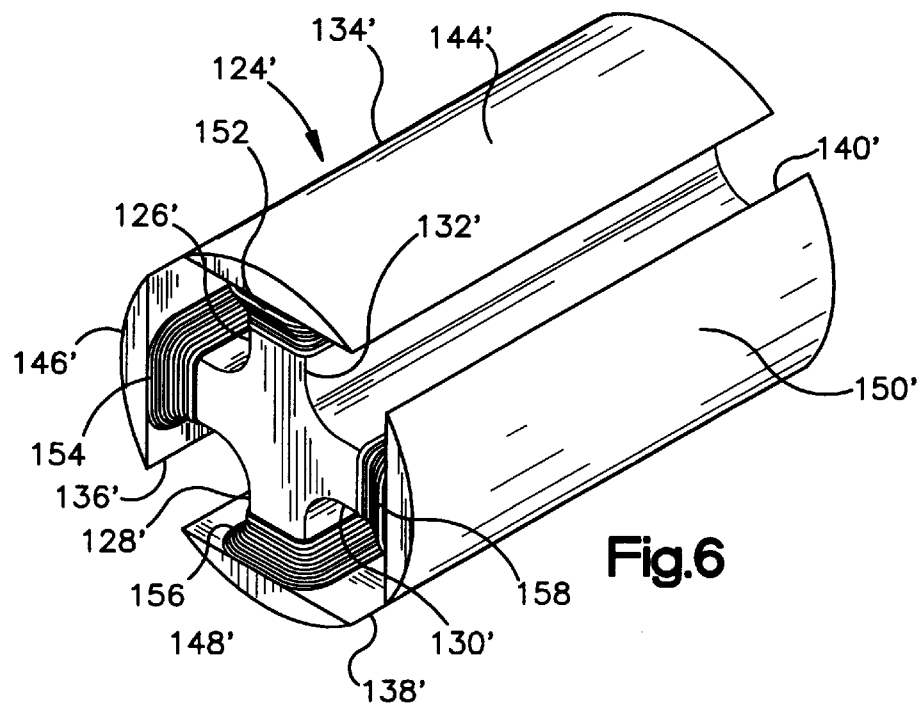
FIG. 6 is another embodiment of the stator subassembly for the motor of FIG. 1.

Referring to FIG. 6, an alternative embodiment of a four pole stator subassembly is indicated generally at 124' and employs a unitary or one-piece stator core having an elongated generally cruxiform transverse configuration with radially outwardly extending webs 126', 128', 130', 132' each of which has formed integrally therewith a pole segment or shoe denoted respectively by reference numerals 134', 136', 138', 140'. Each of the pole segments has a truncated cylindrical outer pole shoe surface denoted respectively by reference numerals 144', 146', 148', 150'. Each of the webs 126', 128', 130', 132' has wound there around, preferably by a technique known as fly winding, a stator coil respectively denoted by reference numerals 152, 154, 156, 158. It will be understood that the stator subassembly arrangement 124' of FIG. 6 utilizes the alternative four magnet rotor 56' of FIG. 3.

Figure 7:
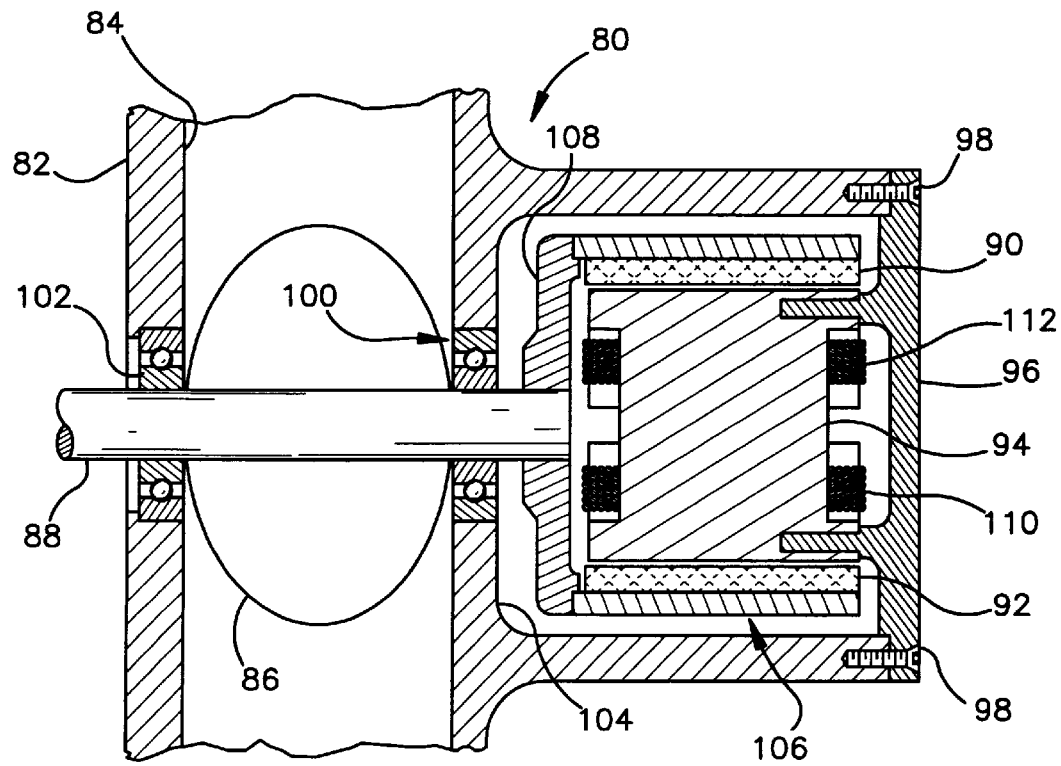
FIG. 7 is an alternative arrangement of the torque motor of the present invention installed for operation of an engine air throttle.

Referring to FIG. 7, another embodiment indicated generally at 200 the motor of FIG. 1 is employed in a vehicle throttle actuator assembly indicated generally at 80 and has a base 82 comprised of a throttle body having an air inlet passage 84 with a butterfly valve member 86 disposed therein and mounted on a shaft 88 which is journaled in a pair of bearings indicated generally at 100, 102 disposed on opposite sides of the passage 84. Shaft 88 extends through bearing 100 into a recess or cavity 104 formed in the base 82 which cavity has received therein the rotor indicated generally at 106 of torque motor 200 which rotor has a generally cup-shaped configuration with a closed end 108 thereof attached to the end of shaft 88. The rotor 106 has a plurality of permanent magnets 90, 92 disposed about the inner periphery thereof in a manner similar to that illustrated with respect to the embodiment of FIG. 3. A stator core 94 is nested in the rotor 106; and, the stator core 94 is attached to a plate 96 which is secured to the base by any suitable expedient such as for example screws 98. It will be understood that the stator core may be formed to any of the configurations shown in FIGS. 2a, 2b, 3, 4, 5 and 6. The stator core has a plurality of core windings 110, 112 thereabout in a manner described herein above with respect to any of the particular stator subassembly arrangements described above. It will also be understood that the number of stator pole segments should correspond to the number of magnets as described above with respect to the other illustrated embodiments.

The embodiment of FIG. 7 thus provides an electrically operated engine air throttle with a torque motor, which is of an inverted construction with respect to the embodiment of FIG. 1 in that the shaft does not pass through the stator core. The construction of the motor 200 in the embodiment 80 of FIG. 7 thus provides a increased amount of magnetically permeable material in the stator by virtue of eliminating the shaft clearance hole and is appropriate where it is feasible to remotely support the stator from the throttle body structure.

Figure 8:
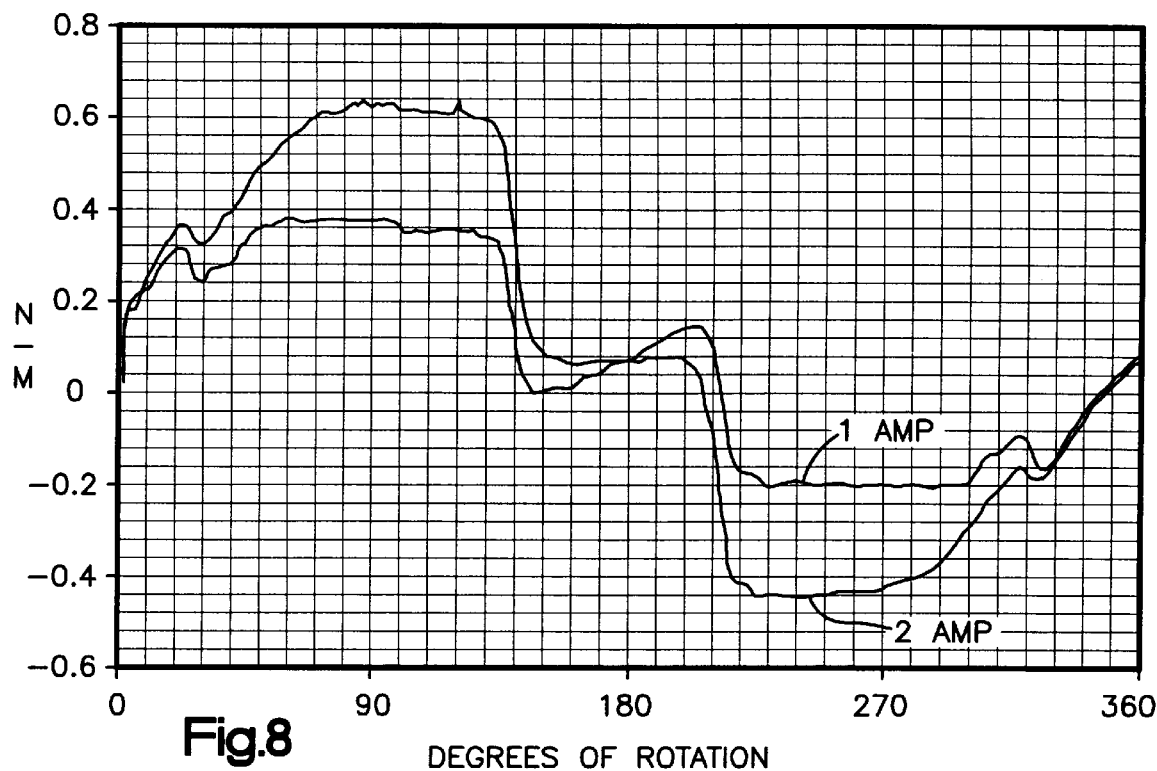
FIG. 8 is a family of curves of a motor shaft Torque (N.M.) plotted as a function of shaft rotation (degrees) for a two pole version of the invention at various levels of coil current (Amps); and, FIG. 9 is a graph similar to FIG. 8 for a four pole version of the invention.
Figure 9:
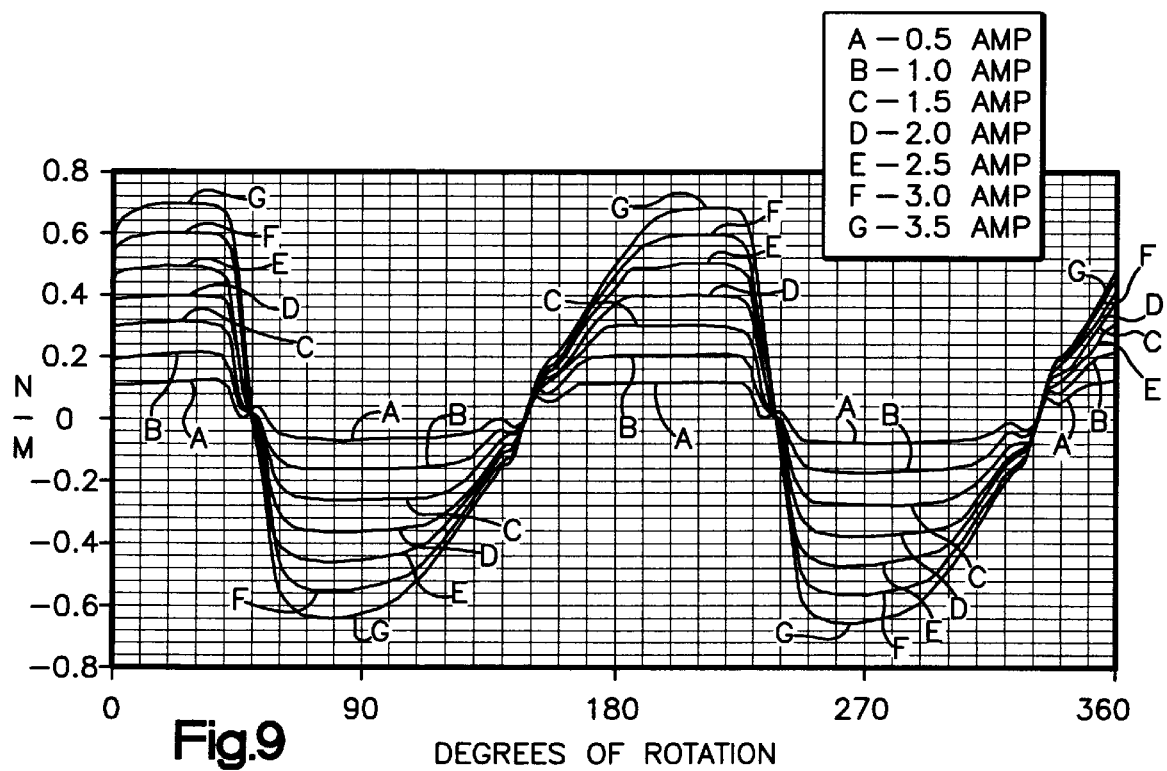

In the present practice of the invention a two-pole motor having the parameters set forth in Table I has been found to provide the torque characteristics illustrated in FIG. 8;

and, a four pole motor made according to Table I provides the torque characteristics illustrated in FIG. 9.

TABLE 1

|  | 2 Pole | 4 Pole |
| --- | --- | --- |
| Rotor OD (mm) | 50 | 46.5 |
| Rotor length (mm) | 50 | 50 |
| Core length (mm) | 45 | 35 |
| Mass: Stator and Rotor, Magnet, Coils (gms) | 335 | 264 |
| N.M/Ampere @20° | 0.26 | 0.19 |
| COIL TURNS | 62 | 120/pole piece |
| COIL WIRE *(AWG) | 25 | 25 |

The present invention thus provides a unique and novel torque motor construction which has the stator nested within the cup-shaped rotor; and, the stator has pole shoe segments which extend axially and transversely beyond the stator webs about which the stator coils are disposed.

The various embodiments illustrated for the present invention commonly employ axial extensions, such as those denoted by reference numerals 51, 53, which provide increased total flux for a given motor volume without an increase in ampere turns of electrical energization.

The rotor employs permanent magnets disposed about the inner periphery thereof and a number corresponding to the number of stator poles. The torque motor construction of the present invention is intended for applications where the rotor moves in opposite directions in an angular displacement less than one full revolution and where relatively high torque is required from a minimum volume and mass of motor. The torque motor of the present invention is particularly suitable for an inlet throttle actuator for an internal combustion engine.

Although the invention has hereinabove been described with respect to the illustrated embodiments, it will be understood that the invention is capable of modification and variation and is limited only by the following claims.

We claim:

1. A torque motor comprising:

(a) base structure;

(b) a stator formed of material of relatively high magnetic permeability having a plurality of pole segments each having a generally radially outwardly extending web portion with a generally cylindrically configured face portion, with each of said face portions having a wing portion extending axially beyond said web portion;

(c) means attaching said stator to said base structure;

(d) a generally cylindrical hollow rotor nested over said stator and having a plurality of magnets disposed on the inner periphery thereof with one of said magnets corresponding to each of said pole segments; said rotor mounted on said base for rotation with respect to said stator wherein said base structure includes a shaft extending centrally through said stator, with said rotor journalled on said shaft for rotation; and, (e) at least two coils of electrically conductive material wound on said pole segment webs, wherein upon electrical energization said rotor is operative to rotate not more than one half revolution in each of a clockwise and anti-clockwise direction.

2. The torque motor defined in claim 1, wherein said stator is formed of laminated material.

3. The torque motor defined in claim 1, wherein said wing portions of said stator extend axially to a station generally coinciding with the outer periphery of said coils.

4. The torque motor defined in claim 1, wherein said means attaching said stator to said base structure includes a plurality of through bolts.

5. The torque motor defined in claim 1, wherein each of said pole segment face portions extend transversely beyond the periphery of said coil.

6. The torque motor defined in claim 1, wherein said rotor has a generally cupped shaped configuration.

7. The torque motor defined in claim 1, wherein said stator webs are formed integrally as a one piece member and said face portions are each formed on a shoe member attached to one of said webs.

8. The torque motor defined in claim 1, wherein said stator has a generally cruciform configuration in transverse section with said coils wound around each of two oppositely directed webs.

* * * * *